(12) United States Patent
Asada et al.

(10) Patent No.: US 11,566,996 B2
(45) Date of Patent: Jan. 31, 2023

(54) CORROSION RESISTANCE TESTER FOR COATED METAL MATERIAL

(71) Applicant: MAZDA MOTOR CORPORATION, Hiroshima (JP)

(72) Inventors: Teruaki Asada, Hiroshima (JP); Katsunobu Sasaki, Kure (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 433 days.

(21) Appl. No.: 16/729,851

(22) Filed: Dec. 30, 2019

(65) Prior Publication Data
US 2020/0232905 A1 Jul. 23, 2020

(30) Foreign Application Priority Data
Jan. 18, 2019 (JP) .............................. JP2019-007371

(51) Int. Cl.
*G01N 17/00* (2006.01)
*G01N 17/02* (2006.01)
(Continued)

(52) U.S. Cl.
CPC .......... *G01N 17/006* (2013.01); *G01N 17/00* (2013.01); *G01N 17/02* (2013.01); *G01N 17/04* (2013.01);
(Continued)

(58) Field of Classification Search
CPC ...... G01N 17/006; G01N 17/02; G01N 17/00; G01N 17/04; C23F 13/04; C23F 13/02; C23F 2213/32
See application file for complete search history.

(56) References Cited

U.S. PATENT DOCUMENTS

| 4,962,360 A | 10/1990 | Homma et al. |
| 2011/0043239 A1* | 2/2011 | Tomita ............... H01R 13/2414 324/756.03 |

(Continued)

FOREIGN PATENT DOCUMENTS

| CN | 109073534 A | 12/2018 |
| JP | S54-003756 U | 1/1979 |

(Continued)

OTHER PUBLICATIONS

X. Qi et al., "Two-Electrode Electrochemical Impedance Sensor: Part 1—Response to Coating Degradation on Conductive Substrates"; Corrosion; May 2009; pp. 343-349; vol. 65, No. 5; XP-001545585.

*Primary Examiner* — Raul J Rios Russo
(74) *Attorney, Agent, or Firm* — Studebaker & Brackett PC

(57) ABSTRACT

A corrosion resistance tester for a coated metal material including a surface treatment film on a metal substrate includes: a container placed on the surface treatment film, and having a bottom surface in contact with the surface treatment film, the container including a plurality of water-containing electrolyte material holders that open through the bottom surface; the water-containing electrolyte material contained in each of the water-containing electrolyte material holders of the container, and being in contact with an associated one of a plurality of separate measurement target portions of the surface treatment film; a plurality of electrodes being each in contact with the water-containing electrolyte material contained in an associated one of the water-containing electrolyte material holders; an external circuit connecting the electrodes together; and a conduction means configured to conduct electricity to the metal substrate through the electrodes and the external circuit.

20 Claims, 11 Drawing Sheets

(51) Int. Cl.
*G01N 17/04* (2006.01)
*C23F 13/04* (2006.01)
*C23F 13/02* (2006.01)

(52) U.S. Cl.
CPC .............. *C23F 13/02* (2013.01); *C23F 13/04* (2013.01); *C23F 2213/32* (2013.01)

(56) References Cited

U.S. PATENT DOCUMENTS

| | | | |
|---|---|---|---|
| 2019/0064052 A1 | 2/2019 | Iannuzzi et al. | |
| 2020/0182824 A1* | 6/2020 | Asada | G01N 27/413 |
| 2021/0010926 A1* | 1/2021 | Asada | G01N 17/02 |
| 2021/0396649 A1* | 12/2021 | Asada | G01N 27/49 |
| 2021/0396650 A1* | 12/2021 | Asada | G01N 27/4161 |

FOREIGN PATENT DOCUMENTS

| | | |
|---|---|---|
| JP | S60-091250 A | 5/1985 |
| JP | S60-173451 A | 9/1985 |
| JP | S61-031948 A | 2/1986 |
| JP | H05-187991 A | 7/1993 |
| JP | 2007271501 A | 10/2007 |
| JP | 2011-033596 A | 2/2011 |
| JP | 2016050915 A | 4/2016 |
| JP | 2016050916 A | 4/2016 |
| WO | 98/50788 A1 | 11/1998 |
| WO | 2017/149000 A1 | 9/2017 |

* cited by examiner

FIG.7

| DEPOSITION ON COAT | EXPOSURE ENVIRONMENT | ELECTRODEPOSITION BAKING CONDITION | THICKNESS OF ELECTRODEPOSITION COAT (μm) | WATER ABSORPTION μgmm⁻³ (AFTER 9 DAYS) | SWELLING RATE (%) (AFTER 9 DAYS) | APPEARANCE (AFTER 9 DAYS) |
|---|---|---|---|---|---|---|
| WATER | 50°C, 98% | 150°C × 20 MIN. | 10 | 18.9 | 0.1 | |
| 5% OF NaCl (SPRAY) | 50°C, 98% | 150°C × 20 MIN. | 10 | 29.8 | 0.7 | |
| 5% OF CaCl (SPRAY) | 50°C, 98% | 150°C × 20 MIN. | 10 | 22.6 | 0.4 | |

FIG.8

| DEPOSITION ON COAT | EXPOSURE ENVIRONMENT | ELECTRODEPOSITION BAKING CONDITION | THICKNESS OF ELECTRODEPOSITION COAT (μm) | WATER ABSORPTION μg mm⁻³ (AFTER 9 DAYS) | SWELLING RATE (%) (AFTER 9 DAYS) | APPEARANCE (AFTER 9 DAYS) |
|---|---|---|---|---|---|---|
| SIMULATED MUD | 50°C, 98% | 140°C × 15 MIN. | 10 | 1150.2 | 40 | |
| | | 140°C × 20 MIN. | 10 | 1372.9 | 50 | |
| | | 150°C × 20 MIN. | | 248.8 | 5.8 | |
| | | | 15 | 63.2 | 4.8 | |

FIG.9

| DEPOSITION ON COAT | EXPOSURE ENVIRONMENT | ELECTRODEPOSITION BAKING CONDITION | THICKNESS OF ELECTRODEPOSITION COAT (μm) | WATER ABSORPTION μg mm⁻³ (AFTER 9 DAYS) | SWELLING RATE (%) (AFTER 9 DAYS) | APPEARANCE (AFTER 9 DAYS) |
|---|---|---|---|---|---|---|
| 5% OF NaCl (IMMERSION) | 50°C | 140°C × 15 MIN. | | 223.5 | 13.5 | |
| | | 140°C × 20 MIN. | 10 | 81.4 | 7.3 | |
| | | 150°C × 20 MIN. | | 47.7 | 3.5 | |
| | | | 15 | 27.5 | 3 | |

CORROSION RESISTANCE TESTER FOR COATED METAL MATERIAL

CROSS-REFERENCE TO RELATED APPLICATION

This application claims priority to Japanese Patent Application No. 2019-007371 filed on Jan. 18, 2019, the entire disclosure of which is incorporated by reference herein.

BACKGROUND

The present disclosure relates to a corrosion resistance tester for a coated metal material.

Accelerated corrosion tests such as combined cyclic corrosion tests and salt water spray tests have been performed as methods of evaluating the performance of coats.

Such an accelerated corrosion test requires several months for evaluation. It is thus difficult to simply evaluate, for example, the qualities of coats to be coated on steel sheets made of different constituent materials under different baking conditions and to rapidly provide optimum coating conditions. Establishment of a quantitative evaluation method of rapidly and simply evaluating the corrosion resistance of a coated steel sheet is thus desired in the field of quality management related to material development, process management in a coating factory, and vehicle rust prevention.

By contrast, Japanese Unexamined Patent Publication No. 2007-271501 discloses evaluating the anticorrosion performance of a coat as a method of evaluating the corrosion resistance of the coat on a surface of a metal member. In the method, the metal member and a counter electrode member are immersed into water or an electrolyte. The negative terminal of a measuring power supply is electrically connected to the metal member, whereas the positive terminal is electrically connected to the counter electrode member. The anticorrosion performance is evaluated based on an oxygen diffusion-limited current flowing from the counter electrode member through the coat to the metal member.

Japanese Unexamined Patent Publication No. 2016-50915 discloses evaluating the corrosion resistance of a coated metal material as follows. An electrode is disposed on the surface of the coated metal material provided with a coat with the water-containing electrolyte material interposed therebetween. A voltage is applied between the substrate of the coated metal material and the surface with the coat. The corrosion resistance is evaluated based on the voltage at breakdown of the coat.

Japanese Unexamined Patent Publication No. 2016-50916 discloses evaluating the corrosion resistance of a coated metal material as follows. An electrode is disposed on the surface of the coated metal material provided with a coat with the water-containing electrolyte material interposed therebetween. The water-containing electrolyte material penetrates into the coat of the coated metal material. A voltage is applied between the substrate of the coated metal material and the surface with the coat. The corrosion resistance is evaluated based on a value related to a current flowing upon application of the voltage.

SUMMARY

A plurality of measurement target portions may be provided on a surface treatment film of a coated metal material, a plurality of combinations of an electrode and an electrolyte material may be arranged to correspond to the measurement target portions, respectively, and electric current may be introduced between the electrodes to test the corrosion resistance of the coated metal material. In this case, the combinations of the electrode and the electrolyte material are positioned to respectively correspond to the measurement target portions. Arrangement of a plurality of measurement containers complicates the configuration of a corrosion resistance tester, reduces the reliability of a corrosion resistance test due to the displacement of the measurement containers, and causes other problems.

It is therefore an object of the present disclosure to provide a corrosion resistance tester which has a simple configuration and which may improve the reliability of a corrosion resistance test.

To achieve the foregoing object, a corrosion resistance tester according to the present disclosure is directed to a corrosion resistance tester for a coated metal material including a surface treatment film on a metal substrate. The tester includes: a container placed on the surface treatment film, and having a bottom surface in contact with the surface treatment film, the container including a plurality of water-containing electrolyte material holders that open through the bottom surface; the water-containing electrolyte material contained in each of the water-containing electrolyte material holders of the container, and being in contact with an associated one of a plurality of separate measurement target portions of the surface treatment film; a plurality of electrodes being each in contact with the water-containing electrolyte material contained in an associated one of the water-containing electrolyte material holders; an external circuit connecting the electrodes together; and a conduction means configured to conduct electricity to the metal substrate through the electrodes and the external circuit.

A method of testing corrosion resistance according to the present disclosure is directed to a method of testing a corrosion resistance of a coated metal material including a surface treatment film on a metal substrate. The method includes: placing a container on the surface treatment film, the container having a bottom surface in contact with the surface treatment film, the container including a plurality of water-containing electrolyte material holders that open through the bottom surface; making each of the water-containing electrolyte material holders of the container contain the water-containing electrolyte material to bring the water-containing electrolyte material into contact with a plurality of separate measurement target portions of the surface treatment film; bringing a plurality of electrodes into contact with the water-containing electrolyte material contained in an associated one of the water-containing electrolyte material holders; and energizing the metal substrate through the electrodes and an external circuit connecting the electrodes together.

According to this configuration, placing a container having a plurality of water-containing electrolyte material holders containing the water-containing electrolyte material on a surface treatment film allows the water-containing electrolyte material to be simply positioned to be in contact with each of a plurality of measurement target portions. Furthermore, the water-containing electrolyte material holders formed through the single container make it easier to dispose the water-containing electrolyte material such that the water-containing electrolyte material is in contact with the predetermined measurement target portions, and make it difficult for the water-containing electrolyte material to be displaced. This can improve the reliability of a corrosion resistance test. This allows a corrosion resistance test to be stably conducted in a decreased time.

In one preferred embodiment, the bottom surface of the container may be flat, and each of the water-containing electrolyte material holders may have an opening formed through the bottom surface, and may be configured as a through-hole passing through the container in a direction perpendicular to the bottom surface.

—Electrical Conduction—

The metal substrate may be, for example, a steel material constituting an electric household appliance, a building material, or an automobile part, a cold rolled steel sheet (SPCC), an alloyed hot-dip galvanized steel sheet (GA), a high-tensile strength steel sheet or a hot stamping material, or a light alloy material. The metal substrate may include, on its surface, a conversion film (e.g., a phosphate film, such as a zinc phosphate film, or a chromate film).

In one particularly preferred embodiment, the metal substrate may be a steel plate, and the container may include magnets near the bottom surface, the magnets being respectively disposed near the openings of the through-holes.

According to this configuration, the magnets disposed near the bottom surface of the container allows the container to be attracted and fixed to the coated metal material including the steel plate as the metal substrate by magnetic force. This can effectively reduce the displacement of the container, and can improve the reliability of the corrosion resistance test. It is recommended that to obtain high attractive forces, neodymium magnets or samarium cobalt magnets be used as the magnets.

In one preferred embodiment, the tester may further include: a first heating element disposed on a periphery of the container to cover peripheries of the water-containing electrolyte material holders; and a temperature controller connected to the first heating element to control a temperature of the first heating element.

According to this configuration, since the temperature of the water-containing electrolyte material contained in the water-containing electrolyte material holders can be adjusted by the first heating element and the temperature controller, the temperature of the water-containing electrolyte material can be kept constant over a desired test period. This allows the corrosion resistance test to be accurately conducted under various temperature conditions. The first heating element may be, for example, a rubber heater or a film heater.

The tester may further include: a second heating element disposed on a surface of the coated metal material remote from the container. The temperature controller may control the temperature of the first heating element and a temperature of the second heating element within a range from 30° C. to 100° C.

According to the present disclosure, the temperatures of the water-containing electrolyte material and the coated metal material are maintained within the above temperature range by the first and second heating elements. This allows the corrosion resistance test to be accurately conducted under various temperature conditions. The second heating element may be, for example, a hot plate.

In one preferred embodiment, the container includes: a bottom portion made of silicone resin, the bottom portion forming the bottom surface of the container; and a body made of an insulative resin material, the body extending in a direction away from the bottom surface of the bottom portion.

According to the present disclosure, the bottom surface of the container in contact with the surface treatment film is made of silicone resin. This can improve the adhesion between the container and the surface treatment film, and can effectively reduce the water-containing electrolyte material leaking from the gap between the container and the surface treatment film. Further, the container body made of an insulative resin material allows the water-containing electrolyte material holders to be reliably insulated from each other, and can reduce the weight and cost of the container. This can in turn lead to a reduction in the apparatus weight and cost.

In one preferred embodiment, each of the measurement target portions may include an artificial defect passing through the surface treatment film to reach the metal substrate, and the conduction means may conduct electricity to the metal substrate to promote corrosion of the coated metal material using at least one of the artificial defects and at least another one of the artificial defects as an anode site and a cathode site, respectively.

Corrosion of metals has been known to proceed through simultaneous occurrence of an anode reaction (an oxidation reaction) and a cathode reaction (a reduction reaction). At the anode reaction, metal in contact with water is dissolved (ionized) to generate free electrons. At the cathode reaction, the free electrons cause the oxygen dissolved in the water to generate a hydroxyl group OR.

According to the present disclosure, the one of the artificial defects of the coated metal material serves as the anode site causing an elution reaction (oxidation reaction) of the metal of the metal substrate. At least another one of the artificial defects, into which the electrons generated at the anode site flow through the metal substrate, serves as the cathode site at which the electrons cause the reduction reaction.

At the anode site, the eluted metal ions are attracted to the electrode (cathode) and reacts with the oxygen dissolved in the water-containing electrolyte material or the $OH^-$ generated by electrolysis of water at the electrode (cathode) to be iron hydroxide. At the anode site supplied with the electrons, the metal of the metal substrate is slightly dissolved as ions in the water-containing electrolyte material in the same principle as electrolytic protection. However, the corrosion of the coated metal material does not progress.

By contrast, at the cathode site, the electrons flowing from the anode site through the metal substrate reacts with the water penetrating into the surface treatment film, the dissolved oxygen, or ionized H+ in the water, thereby generating hydrogen or $OH^-$. Hydrogen is also generated by the electrolysis of water. This increases pH under the surface treatment film and progresses the corrosion of the coated metal material.

The generation of $OH^-$ at the cathode site corresponds to the cathode reaction of the corrosion model described above. It can be thus said that the corrosion resistance test in which the tester according to the present disclosure is used causes the external circuit to conduct electricity to the metal substrate to accelerate and reproduce the actual corrosion of the coated metal material.

At the one of the artificial defects serving as the cathode site, alkalization (generation of $OH^-$) negatively affects substrate treatment (conversion coating) of the metal substrate surface and degrades the adhesion of the surface treatment film (simply degrades the adhesion between the metal substrate and the surface treatment film, if no substrate treatment is performed), thereby swelling the surface treatment film. Hydrogen gas generated by the electrolysis of water or the reduction of H+ promotes the swelling of the surface treatment film. Therefore, the rate of corrosion progress of a material under test (MUT) can be measured in a corrosion resistance test by checking the degree of the swelling of the surface treatment film.

In this manner, according to the present disclosure, an anode site and a cathode site are artificially formed on the coated metal material, and the water-containing electrolyte material is held by the container to be in contact with the artificial defects. Meanwhile, the conduction means conducts electricity to the metal substrate to promote corrosion of the artificial defects. In this manner, the actual corrosion is accelerated and reproduced, thereby increasing the correlation between the obtained data on the rate of corrosion progress and the actual rate of corrosion progress. Therefore, according to the present disclosure, a highly reliable test can be conducted to examine the corrosion resistance of the coated metal material.

The distance between the artificial defects may be preferably longer than or equal to 2 cm and more preferably longer than or equal to 3 cm to easily check the swelling of the surface treatment film at the cathode site.

In one preferred embodiment, the artificial defect serving as the cathode site has a size ranging from 0.1 mm to 5 mm.

The smaller the size of the artificial defect at the cathode site (the size of the exposed portion of the metal substrate), the lower the electrical conductivity becomes and the less the cathode reaction progresses. On the other hand, the larger the size, the more unstable the cathode reaction becomes and the lower the acceleration and reproducibility of the corrosion become. Setting the size of the artificial defect within the range described above achieves both the promotion of the cathode reaction and the acceleration and reproduction of the corrosion.

In one preferred embodiment, the conduction means conducts electricity to the metal substrate at a current value from 10 μA to 10 mA.

The smaller the conducted current value, the less the corrosion is accelerated, thereby requiring a longer time for a test. On the other hand, the larger the current value, the more unstable the cathode reaction rate becomes and the lower the correlation with the actual progress of the corrosion becomes. Setting the current value within the range described above achieves both a reduction in the test time and an improvement in the reliability of the test.

In one preferred embodiment, the water-containing electrolyte material is mud containing water, a supporting electrolyte, and a clay mineral.

The clay mineral promotes migration of ions and penetration of water into the surface treatment film and thus effectively promotes the progress of corrosion.

The clay mineral is a layered silicate mineral or zeolite in one preferred embodiment. The layered silicate mineral is at least one selected from kaolinite, montmorillonite, sericite, illite, glauconite, chlorite, and talc in one preferred embodiment.

The supporting electrolyte is at least one kind of salt selected from sodium chloride, sodium sulfate, and calcium chloride in one preferred embodiment.

In one preferred embodiment, the surface treatment film is a resin coat.

The resin coat may be, for example, a laminated coating film including an epoxy or acrylic resin-based cationic electrodeposition coat (primer coat). The laminated coating film may be obtained through depositing a finish coat on the electrodeposition coat or depositing an intermediate coat and a finish coat on the electrodeposition coat.

The electrode may be embedded in the water-containing electrolyte material to conduct electricity to the metal substrate. Examples of such an electrode include a carbon electrode, and a platinum electrode. In particular, a perforated electrode with at least one hole opposed to the surface treatment film may be used as such an electrode, which is disposed substantially parallel to the surface treatment film in one preferred embodiment. For example, the perforated electrode is in a ring shape with, at its center, a hole opposed to one of the artificial defects. Alternatively, the perforated electrode may be a mesh electrode substantially parallel to the surface treatment film with the mesh electrode embedded in the water-containing electrolyte material.

According to the present disclosure, placing a container having a plurality of water-containing electrolyte material holders containing the water-containing electrolyte material on a surface treatment film allows the water-containing electrolyte material to be in contact with each of a plurality of measurement target portions with a simple configuration. Furthermore, the water-containing electrolyte material holders formed through the single container make it easier to dispose the water-containing electrolyte material such that the water-containing electrolyte material is in contact with the predetermined measurement target portions, and make it difficult for the water-containing electrolyte material to be displaced. This can improve the reliability of a corrosion resistance test. This allows a corrosion resistance test to be stably conducted in a decreased time.

BRIEF DESCRIPTION OF THE DRAWINGS

FIG. 7 is a table showing the water absorption and swelling rates of coats on which water, a spray of 5% of NaCl, and a spray of 5% of CaCl2 are deposited.

FIG. 8 is a table showing the water absorption and swelling rate of a coat on which simulated mud is deposited.

FIG. 9 is a table showing the water absorption and swelling rate of a coat on which 5% of NaCl (immersion) is deposited.

DETAILED DESCRIPTION

Embodiments of the present disclosure will now be described with reference to the drawings. The following description of preferred embodiments is only an example in nature, and is not intended to limit the scope, applications or use of the present invention.

First Embodiment

Corrosion Resistance Tester

Figure 1:
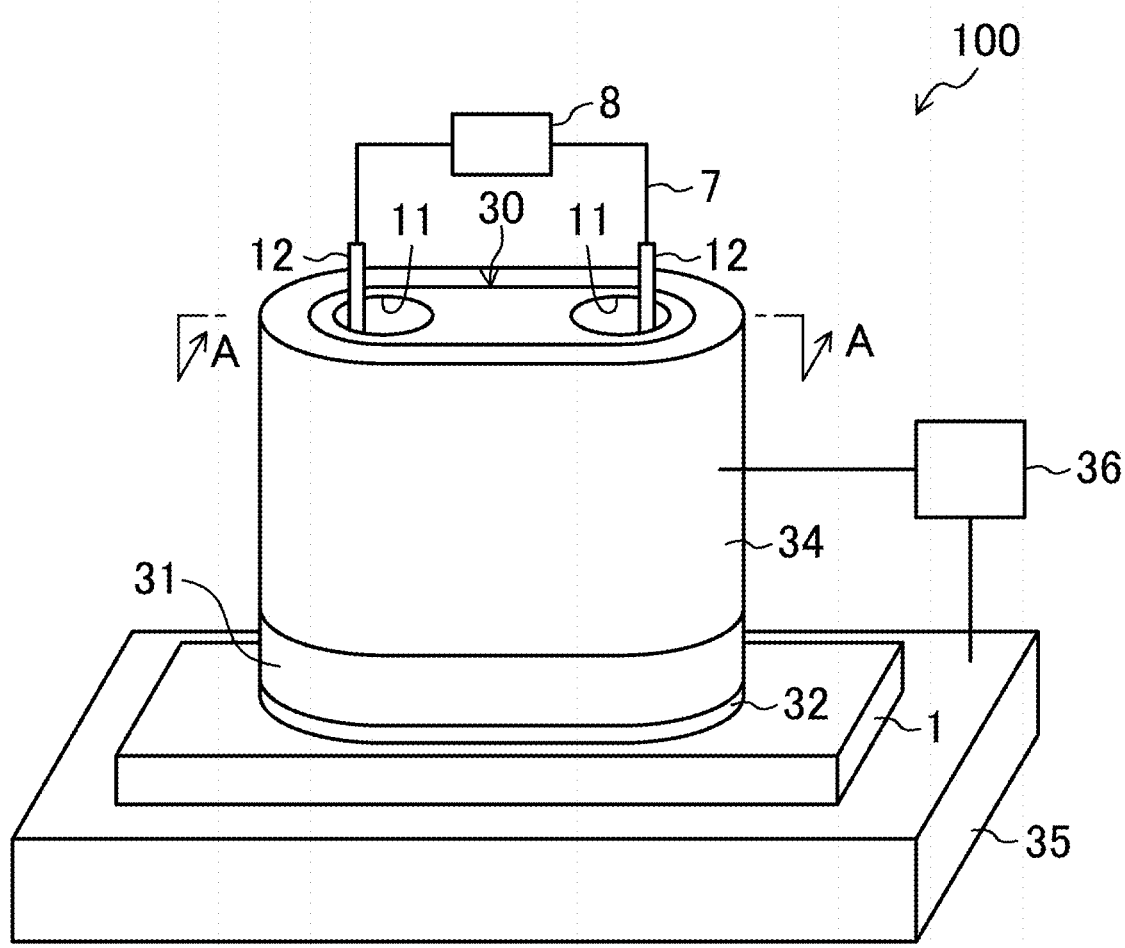
FIG. 1 illustrates a corrosion resistance tester according to a first embodiment.
Figure 2:
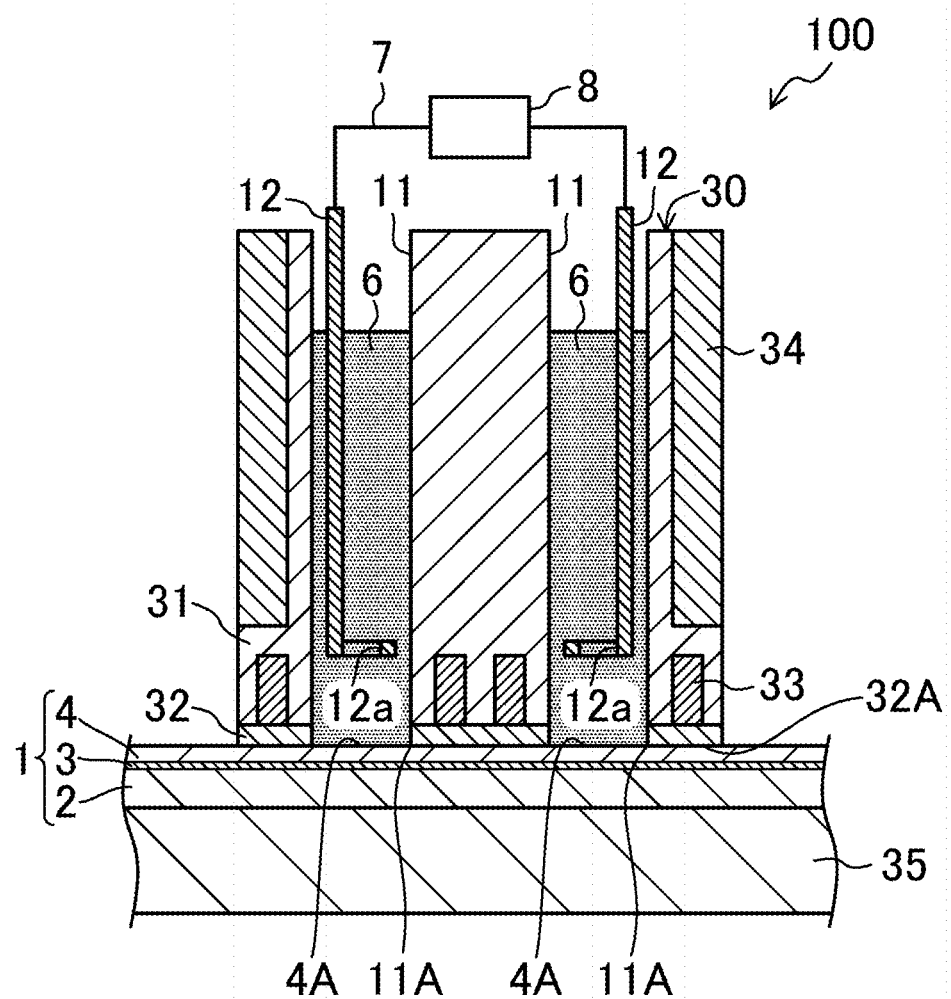
FIG. 2 is a cross-sectional view taken along line A-A shown in FIG. 1.
Figure 3:
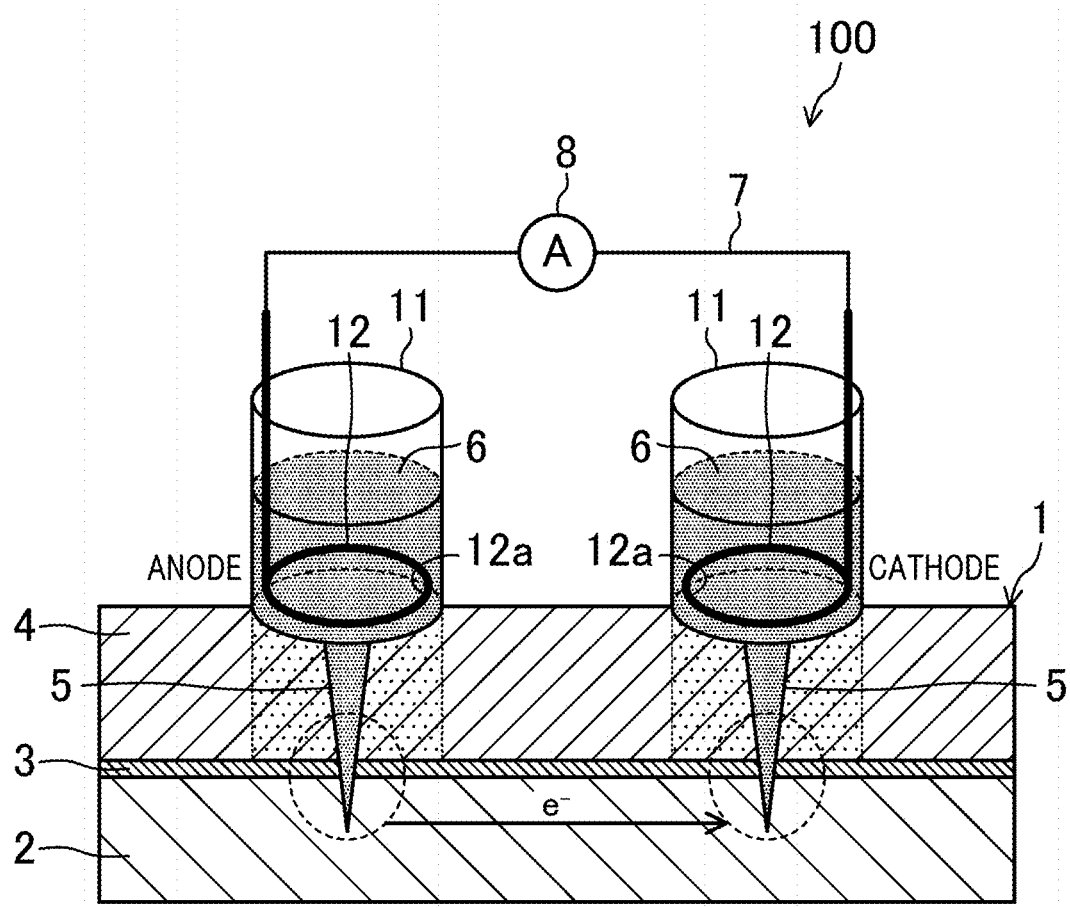
FIG. 3 illustrates the principle of a corrosion resistance test in which the corrosion resistance tester shown in FIG. 1 is used.

As illustrated in FIGS. 1 to 3, a corrosion resistance tester 100 according to this embodiment is an apparatus for testing the corrosion resistance of a coated metal material 1, and includes a container 30, the water-containing electrolyte material 6, electrodes 12, an external circuit 7, a conduction means 8, a rubber heater 34 (a first heating element), a hot plate 35 (a second heating element), and a temperature controller 36.

Coated Metal Material

As illustrated in FIGS. 2 and 3, the coated metal material 1 includes a resin coat (i.e., an electrodeposition coat 4 in this embodiment) as a surface treatment film on a steel sheet 2 as a metal substrate. The steel sheet 2 has, on its surface, a conversion film 3.

As illustrated in FIGS. 2 and 3, the coated metal material 1 has two (a plurality of) separate artificial defects 5 passing through the electrodeposition coat 4 and the conversion film 3 to reach the steel sheet 2. The artificial defects 5 are respectively introduced into measurement target portions 4A of the electrodeposition coat 4 on which the water-containing electrolyte material 6 is disposed. To promote the migration of ions and penetration of water into the electrodeposition coat 4 and effectively progress corrosion of the artificial defects 5 in a corrosion resistance test described below, the diameter of a portion of the steel sheet 2 exposed by each of the artificial defects 5 (hereinafter sometimes referred to as the "diameter of the artificial defect 5") may range preferably from 0.1 mm to 5 mm (i.e., the areas of the exposed surfaces may range from 0.01 $mm^2$ to 25 $mm^2$), more preferably from 0.3 mm to 2 mm, and particularly preferably from 0.5 mm to 1.5 mm. To easily check the swelling of the electrodeposition coat 4 at the cathode site in corrosion resistance evaluation of a corrosion resistance testing method described below, the distance between the two artificial defects 5 may be preferably 2 cm or more and more preferably 3 cm or more.

Container

As illustrated in FIGS. 1 and 2, the container 30 is placed on the electrodeposition coat 4 of the coated metal material 1. The container 30 has a flat bottom surface 32A, and includes a bottom portion 32 forming the bottom surface 32A, and an insulative body 31 extending in a direction away from the bottom surface 32A of the bottom portion 32.

Figure 4:
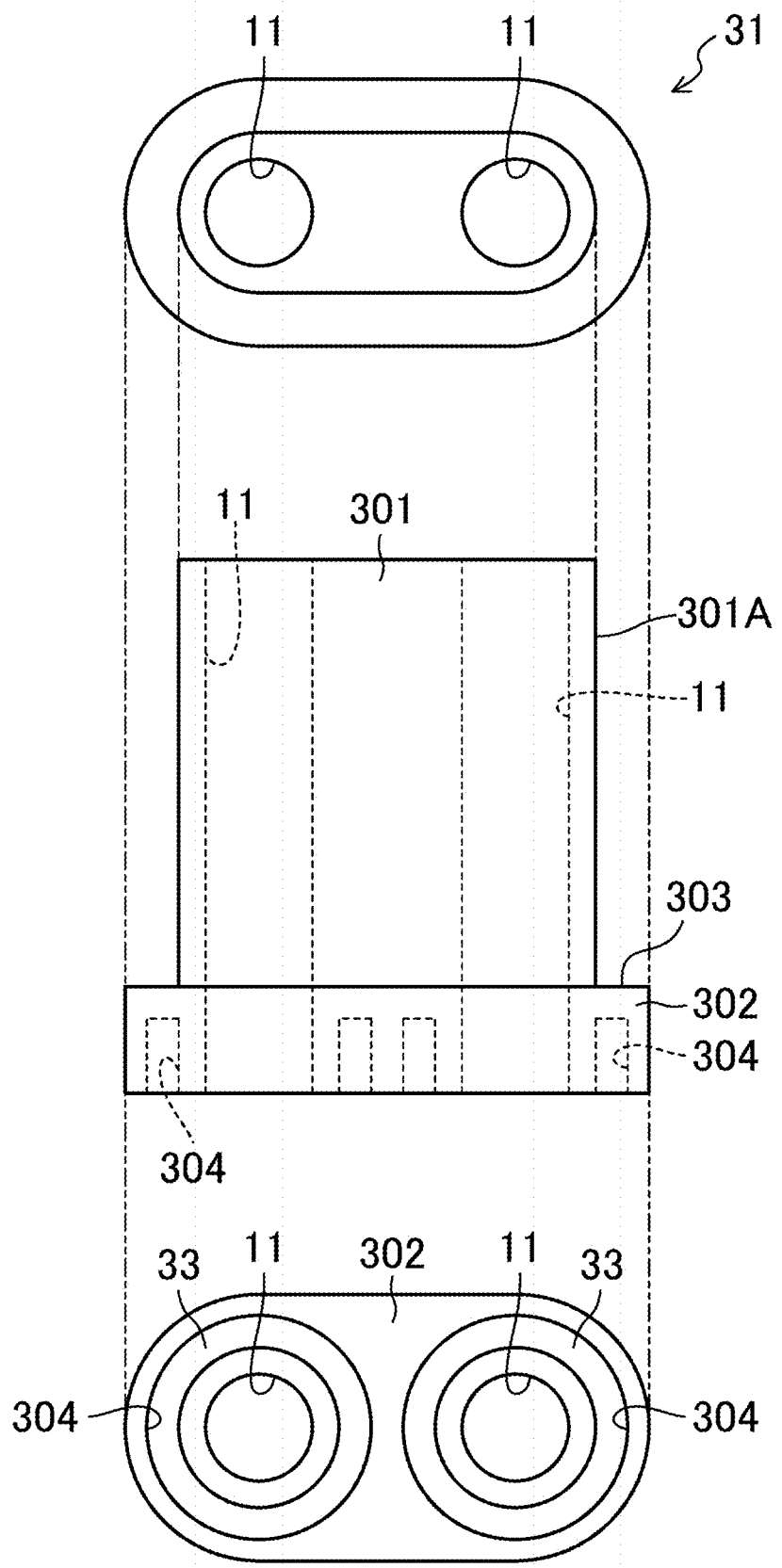
FIG. 4 is a plan view, a front view, and a bottom view of a container body.

As illustrated in FIGS. 1 and 4, the container 30 is a member that is elliptical in plan view, and is a cylindrical member having two (a plurality of) through-holes 11, which pass through the container 30, i.e., the body 31 and bottom portion 32 of the container 30, in a direction substantially perpendicular to the bottom surface 32A. The through-holes 11 each have an opening 11A formed through the bottom surface 32A. The water-containing electrolyte material 6 is contained in the through-holes 11, and is in contact with the surface of the electrodeposition coat 4. That is to say, the two through-holes 11 each constitute the water-containing electrolyte material holder that opens through the bottom surface 32A in contact with the electrodeposition coat 4. Regions of the coated metal material 1 defined by the openings 11*a* serve as the measurement target portions 4A with the container 30 placed on the electrodeposition coat 4 of the coated metal material 1.

The bottom portion 32 is a sheet-like sealing material made of silicone resin, for example, and is used to improve the adhesion between the container 30 and the electrodeposition coat 4 when the container 30 is placed on the coated metal material 1. This can effectively reduce the water-containing electrolyte material 6 leaking from the gap between the container 30 and the electrodeposition coat 4.

As illustrated in FIG. 4, the body 31 of the container 30 has a base portion 302 near the bottom portion 32, and an extension portion 301 extended from the base portion 302 in a direction away from the bottom portion 32. The base portion 302 has a larger diameter than the extension portion 301 in plan view, and has a step portion 303 at the junction between the base portion 302 and the extension portion 301. A portion of the base portion 302 near the bottom portion 32 has grooves 304. The grooves 304 are respectively positioned around portions of the through-holes 11 in the vicinity of the openings 11A of the through-holes 11, and each contain a ring-shaped magnet 33. Thus, while the container 30 is placed on the electrodeposition coat 4 of the coated metal material 1, the container 30 is attracted and fixed to the coated metal material 1 by the attraction forces of the magnets 33. This can effectively reduce the displacement of the container 30, and can improve the reliability of the corrosion resistance test to be described below. In one preferred embodiment, the magnets 33 are each encapsulated in, for example, epoxy resin after being contained in the associated groove 304. This can substantially prevent the magnets 33 from being removed from the associated grooves 304, substantially prevent the water-containing electrolyte material 6 from leaking through the through-holes 11 into the grooves 304, and substantially prevent other unwanted situations.

To reliably insulate the two through-holes 11 from each other, the body 31 of the container 30 may be made of, for example, a resin material such as acrylic resin or epoxy resin, or a ceramic material. To reduce the weight and cost of the container 30, the body 31 is made of a resin material such as acrylic resin or epoxy resin in one preferred embodiment.

The through-holes 11 each have a larger diameter than the associated artificial defect 5. In one preferred embodiment, the container 30 is placed on the electrodeposition coat 4 such that the through-holes 11 are concentric with the artificial defects 5, respectively. The container 30 having the foregoing configuration can contain a necessary and sufficient amount of the water-containing electrolyte material 6 for the corrosion resistance test while the entire artificial defects 5 are covered with the water-containing electrolyte material 6. As described above, if the diameter of the artificial defects 5 is from 0.1 mm to 5 mm, the diameter of the through-holes 11 may be set to be, for example, from 0.5 mm to 40 mm, and preferably from 0.5 mm to 35 mm. The container 30 having this configuration can contain a necessary and sufficient amount of the water-containing electrolyte material 6 for the corrosion resistance test while the entire artificial defects 5 are covered with the water-containing electrolyte material 6.

Water-Containing Electrolyte Material

The water-containing electrolyte material 6 is contained in each of the through-holes 11 of the container 30. In this state, the water-containing electrolyte material 6 is in contact with each of the two separate measurement target portions 4A of the electrodeposition coat 4, and enters the inside of the artificial defects 5 respectively formed in the measurement target portions 4A.

The water-containing electrolyte material 6 is mud containing water, a supporting electrolyte, and preferably clay minerals, and functions as an electric conductor.

The supporting electrolyte (salt) may be at least one kind of salt selected from sodium chloride, sodium sulfate, calcium chloride, calcium phosphate, potassium chloride, potassium nitrate, potassium hydrogen tartrate, and magnesium sulfate, for example. Out of these, at least one kind of salt selected from sodium chloride, sodium sulfate, and calcium chloride may be used in one particularly preferred embodiment. The water-containing electrolyte material 6 may contain the supporting electrolyte at a concentration ranging preferably from 1% by mass to 20% by mass, more preferably from 3% by mass to 15% by mass, and particularly preferably from 5% by mass to 10% by mass.

The clay minerals are used to make the water-containing electrolyte material 6 into mud and promote the migration of ions and penetration of water into the electrodeposition coat 4 to promote corrosion. The clay minerals may be layered silicate minerals or zeolite, for example. The layered silicate minerals may be at least one selected from kaolinite, montmorillonite, sericite, illite, glauconite, chlorite, and talc, for example. Out of these, kaolinite may be used in one particularly preferred embodiment. The water-containing electrolyte material 6 may contain the clay minerals at a concentration ranging preferably from 1% by mass to 70% by mass, more preferably from 10% by mass to 50% by mass, and particularly preferably from 20% by mass to 30% by mass.

The water-containing electrolyte material 6 may contain additives in addition to water, the supporting electrolyte, and the clay minerals. Specific examples of the additives include organic solvents such as acetone, ethanol, toluene, and methanol. If the water-containing electrolyte material 6 contains an organic solvent, the content of the organic solvent preferably ranges from 5% to 60% of water in terms of volume ratio. The volume ratio more preferably ranges from 10% to 40%, and still more preferably ranges from 20% to 30%.

Electrode, External Circuit, and Conduction Means

The electrodes 12 are provided at both ends of the external circuit 7. The electrodes 12 are each embedded in the water-containing electrolyte material 6 in an associated one of the through-holes 11, and are in contact with the water-containing electrolyte material 6.

Each of the electrodes 12 is a ring-shaped perforated electrode with a hole 12a at its center, and is parallel to the electrodeposition coat 4 so that the hole 12a is opposed to, and is concentric with, the associated one of the artificial defects 5. Thus, the electrodes 12 surround the respective artificial defects 5. A voltage is thus stably applied to the electrodeposition coat 4 around the artificial defects 5. This leads to efficient migration of ions and efficient penetration of water into the electrodeposition coat 4 during electrical conduction. The hydrogen gas generated at the artificial defects 5 goes out through the holes 12a of the electrodes 12. This prevents or reduces retention of the hydrogen gas between the electrodes 12 and the electrodeposition coat 4, that is, prevents or reduces deterioration of the electric conductivity.

The external circuit 7 is a wiring between the two electrodes 12, and electrically connects the two measurement target portions 4A of the coated metal material 1 together through the water-containing electrolyte material 6 and the electrodes 12.

The conduction means 8 is configured as a constant direct current supply energizing the steel sheet 2 through the external circuit 7, the electrodes 12, and the water-containing electrolyte material 6. The conduction means 8 may be, for example, a galvanostat. To promote corrosion of the artificial defects 5 in the corrosion resistance test described below, the current value is controlled within a range, preferably from 10 μA to 10 mA, more preferably from 100 μA to 5 mA, and particularly preferably from 500 μA to 2 mA.

Rubber Heater, Hot Plate, and Temperature Controller

The rubber heater 34 is disposed on an outer peripheral portion of the container 30 to cover the peripheries of the through-holes 11, and is used to increase and adjust the temperature of the water-containing electrolyte material 6 in the through-holes 11. Specifically, as illustrated in FIGS. 1 and 4, the rubber heater 34 is disposed on the step portion 303 of the base portion 302 of the body 31 of the container 30 to cover an outer peripheral surface 301A of the extension portion 301. The rubber heater 34 is bonded and fixed to the outer peripheral surface 301A with, for example, an adhesive tape or any other similar material.

The hot plate 35 is disposed on a surface of the coated metal material 1 remote from the container 30, i.e., a surface of the coated metal material 1 near the steel plate 2, and is used to increase and adjust the temperature of the coated metal material 1 from the back of the coated metal material 1.

The temperature controller 36 is electrically connected to the rubber heater 34 and the hot plate 35, and controls the temperatures of the rubber heater 34 and the hot plate 35. In this way, the coated metal material 1 and the water-containing electrolyte material 6 can have their temperatures increased and adjusted.

This configuration allows the water-containing electrolyte material 6 and the coated metal material 1 to be appropriately heated. Thus, in the corrosion resistance test described below, the migration of ions and penetration of water into the electrodeposition coat 4 can be promoted, and corrosion of the artificial defects 5 can be effectively progressed. This allows the corrosion resistance test to be conducted for a shorter period with higher reliability. Further, the temperatures of the water-containing electrolyte material 6 and the coated metal material 1 can be kept constant over a desired test period. This allows the corrosion resistance tests to be accurately conducted under various temperature conditions.

Note that both or any one of the coated metal material 1 and the water-containing electrolyte material 6 may have their temperatures (its temperature) increased and adjusted. To uniformize the temperature distributions of the coated metal material 1 and the water-containing electrolyte material 6, both of the coated metal material 1 and the water-containing electrolyte material 6 have their temperatures increased and adjusted in one preferred embodiment. Specifically, controlling the temperature(s) of the rubber heater 34 and/or the hot plate 35 through the temperature controller 36 allows the coated metal material 1 and/or the water-containing electrolyte material 6 to be set to have a temperature ranging, preferably from 30° C. to 100° C., more preferably from 50° C. to 100° C., and particularly preferably from 50° C. to 80° C.

Method of Testing Corrosion Resistance

An exemplary method of testing the corrosion resistance of the coated metal material 1 using the corrosion resistance tester 100 will be described step by step.

—Introduction of Artificial Defects—

The artificial defects 5 that pass through the electrodeposition coat 4 and the conversion film 3 to reach the steel sheet 2 are introduced into two distant points of the coated metal material 1. The artificial defects 5 may be introduced with any type of tool. For example, a Vickers hardness tester may be used in one preferred embodiment to allow its indenter to damage the coated metal material at a predetermined load in order to prevent variations in the sizes and depths of the artificial defects 5, that is, quantitatively damage the coated metal material.

—Treatment—

The container 30 is put on the electrodeposition coat 4 of the coated metal material 1 such that the through-holes 11 respectively surround the artificial defects 5 at the two points. A predetermined amount of the muddy water-containing electrolyte material 6 is introduced into the through-holes 11. At this time, the ring-shaped electrodes 12 provided at both ends of the external circuit 7 are embedded in the water-containing electrolyte material 6. The through-holes 11 may be concentric with the respective artificial defects 5 in one preferred embodiment. In one preferred embodiment, the electrodes 12 may also respectively have the holes 12a parallel to the surface of the electrodeposition coat 4, and may be respectively concentric with the artificial defects 5.

As a result, the water-containing electrolyte material 6 contained in the through-holes 11 is in contact with the surface of the electrodeposition coat 4 and penetrates into the artificial defects 5. The two artificial defects 5 are then electrically connected together by the external circuit 7 through the electrodes 12 and the water-containing electrolyte material 6 that is in contact with the artificial defects 5.

—Holding—

Before subsequent electrical conduction, the water-containing electrolyte material 6 is contained in the through-holes 11, and is located on the surface of the electrodeposition coat 4. This state is held for a period preferably from one minute to one day, more preferably from 10 minutes to 120 minutes, and particularly preferably from 15 minutes to 60 minutes. This allows the water-containing electrolyte material 6 to penetrate into the electrodeposition coat 4 in one preferred embodiment.

In general, a coated metal material with a coat starts to corrode after a corrosion factor such as salt water has penetrated into the coat and reached the substrate. The process of corrosion of the coated metal material is divided into a stage until occurrence of the corrosion and a stage in which the corrosion progresses. Evaluation can be made through obtaining the period until the corrosion starts (i.e., a non-corrosion period) and the rate at which the corrosion progresses (rate of corrosion progress).

Holding the foregoing state before the conduction promotes, in advance, the migration of ions and penetration of water into the electrodeposition coat 4 (in particular, the migration of ions and penetration of water into regions of the electrodeposition coat 4 around the artificial defects 5 as indicated by dots in FIG. 3). Thus, the states of regions of the coated metal material 1 which are located near the electrodes 12 and which have undergone the non-corrosion period can be artificially created. Accordingly, the corrosion of the conversion film 3 and the steel sheet 2 progresses smoothly in the subsequent electrical conduction. This also promotes the swelling of the electrodeposition coat 4 showing the rate of corrosion progress, thereby reducing the test period. In addition, electricity is conducted to the steel sheet 2 after the end of the so-called non-corrosion period, which allows accurate measurement of the rate of corrosion progress, thereby improving the reliability of the corrosion resistance test.

In the holding of the foregoing state and the subsequent electrical conduction, the temperatures of the rubber heater 34 and the hot plate 35 are adjusted and maintained within the temperature range described above through the temperature controller 36 in one preferred embodiment. Thus, the migration of ions and penetration of water into the electrodeposition coat 4 can be promoted, and corrosion of the artificial defects 5 can be effectively progressed. This allows the corrosion resistance test to be conducted for a shorter period with higher reliability.

—Electrical Conduction—

The conduction means 8 is operated to allow the external circuit 7 to conduct electricity to the steel sheet 2 of the coated metal material 1 through the electrodes 12, the water-containing electrolyte material 6, and the electrodeposition coat 4. The electrical conduction may be controlled at a constant current value within the range described above in one preferred embodiment.

The electrical conduction allows electrons $e^-$ to flow from the water-containing electrolyte material 6 into the steel sheet 2 at one (the left one in FIG. 3) of the two artificial defects 5 connected to an anode of the conduction means 8. The one of the artificial defects 5 serves as an anode site.

The electrons $e^-$ flowing into the steel sheet 2 pass through the steel sheet 2 to migrate to the other artificial defect 5 (the right one in FIG. 3) and goes out of the other artificial defect 5 to the water-containing electrolyte material 6. The other artificial defect 5 serves as a cathode site.

At the anode site supplied with electrons $e^-$, Fe of the steel sheet 2 is dissolved as ions in the water-containing electrolyte material 6 ($Fe \rightarrow Fa^{2+} + 2e^-$) in the same principle as electrolytic protection. However, the corrosion of the coated metal material 1 does not progress.

By contrast, at the cathode site to which the electrons migrate from the anode site, $OH^-$ is generated by the reaction among the water of the water-containing electrolyte material 6, dissolved oxygen, and the electrons $e^-$ ($H_2O + \frac{1}{2}O_2 + 2e^- \rightarrow 2OH^-$). In addition, hydrogen is generated by the reaction between the ionized hydrogen ions of the water-containing electrolyte material 6 and the electrons $e^-$ ($2H^+ + 2e^- \rightarrow H^2$).

$OH^-$ and hydrogen are generated by the cathode reaction (reduction reaction). Hydrogen is also generated by the electrolysis of water.

At the cathode site, the progress of alkalization resulting from generation of $OH^-$ causes the conversion film 3 to dissolve, and causes the corrosion of the steel sheet 2 to progress (generation of hydrated iron oxide). This reduces the adhesion of the electrodeposition coat 4 with the steel sheet 2. The generation of the hydrogen gas swells the electrodeposition coat 4 so that the corrosion of the steel sheet 2 spreads from the artificial defect 5 to a region surrounding the artificial defect 5. As described above, at the cathode site, the swelling of the electrodeposition coat 4 progresses with the progress of the cathode reaction. Thus, in the corrosion resistance evaluation to be described below, the size of the swelling of the electrodeposition coat 4 at the cathode site can be estimated to evaluate the corrosion resistance of the coated metal material 1.

The electrical conduction may be performed for, for example, 0.5 hours to 24 hours to sufficiently spread the swelling of the coat. The electrical conduction period may be preferably from one hour to ten hours, and more preferably from one hour to five hours.

In electrical conduction of the external circuit 7, cations (e.g., Na+) in the water-containing electrolyte material 6 migrate toward the steel sheet 2 through the electrodeposition coat 4, upon application of a voltage to the water-containing electrolyte material 6 at the cathode site. Water drawn by these cations penetrates into the electrodeposition coat 4. On the other hand, at the anode site as well, anions (e.g., Cl−) in the water-containing electrolyte material 6 migrate toward the steel sheet 2 through the electrodeposition coat 4. Water drawn by these anions penetrates into the electrodeposition coat 4.

In this manner, the electrical conduction promotes the penetration of the ions and water into portions of the electrodeposition coat 4 around the artificial defects 5 at the anode and cathode sites. Accordingly, the flow of electricity is rapidly stabilized. As a result, the corrosion stably spreads from the artificial defect 5 at the cathode site to a region surrounding the artificial defect 5.

—Evaluation of Corrosion Resistance—

As described above, the progress of corrosion at the cathode site appears as the development of the swelling of the electrodeposition coat 4, that is, the spread of the swelling of the coat. Observing how much the swelling of the coat spreads when the predetermined time has passed from the start of the electrical conduction allows the corrosion resistance (particularly, the rate of corrosion progress) of the coated metal material 1 to be evaluated.

After the corrosion resistance test, the adhesive tape is bonded to the electrodeposition coat 4 to remove a swelling portion of the electrodeposition coat 4. The size (hereinafter referred to as "size of removal") of the exposed surface of the steel sheet 2 is measured, thereby determining how much the swelling of the coat spreads.

Figure 5:
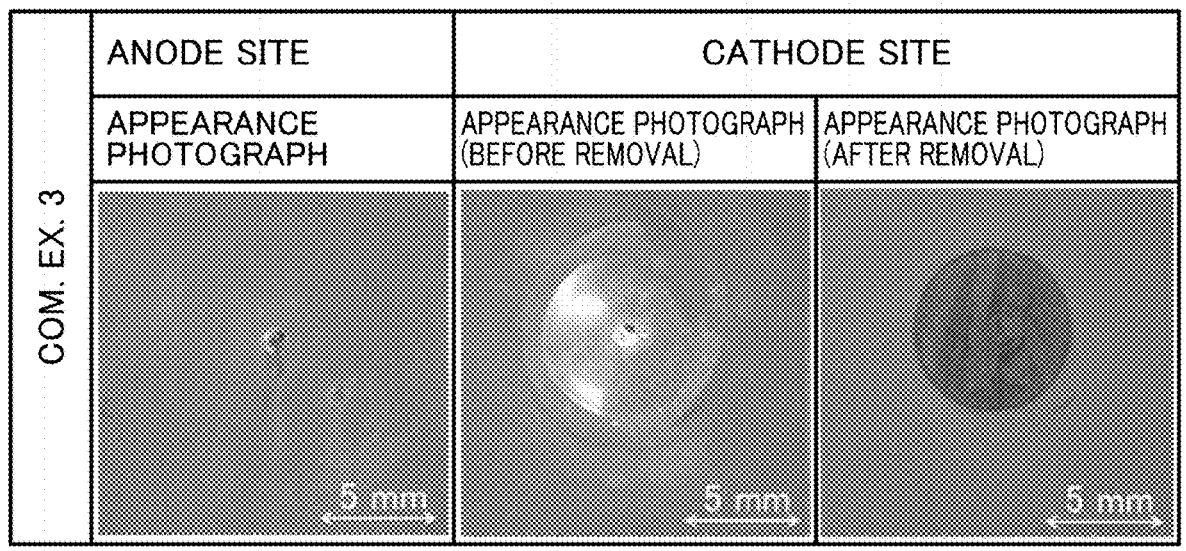
FIG. 5 is a table showing corrosion resistance test results of a material under test 1 in a third comparative example.

Specifically, FIG. 5 provides appearance photographs of the anode and cathode sites of a material under test (MUT) 1 of a third comparative example in a corrosion resistance test described below. The "appearance photograph (before removal)" is the photograph of the surface of the coated metal material 1 after the test. The "appearance photograph (after removal)" is the photograph of the surface of the coated metal material 1 from which a swelling portion of the electrodeposition coat 4 is removed with an adhesive tape. At the anode site, the formation of the artificial defect 5 but no swelling of the electrodeposition coat 4 can be observed. On the other hand, at the cathode site, the artificial defect 5 and the swelling portion of the electrodeposition coat 4 around the artificial defect 5 are observed.

If the corrosion resistance of the coated metal material 1 is evaluated in association with actual corrosion tests (salt water spray tests), the relationship between the rates of corrosion progress (an increase in the size of the swelling portion of the coat per unit time) according to the present corrosion tests and the actual corrosion tests are obtained in advance. The degrees of corrosion resistances can be obtained based on the results of the present corrosion resistance tests in correspondence to the actual corrosion tests.

EXPERIMENTAL EXAMPLE

—Corrosion Resistance Test—

Seven types of MUTs (coated metal materials) shown in Table 1 were prepared, among which the coating conditions, that is, periods during which chemical treatment was performed using zinc phosphate and conditions on which electrodeposition coating was baked varied. The metal substrate of each of the MUTs 1 to 7 is the steel sheet 2, and the electrodeposition coat 4 has a thickness of 10 μm. The details of the coating conditions A to G shown in Table 1 are shown in Table 2.

TABLE 1

|  |  |  | Com Ex. |  |  |  | Ref | Test |
|---|---|---|---|---|---|---|---|---|
|  |  |  | 1 | 2 | 3 | 4 | Ex. 1 | Ex. 1 |
| Temperature (° C.) |  |  | 23 | 50 | 50 | 70 | 70 | — |
| Clay Minerals |  |  | — | — | Kaolinite | Kaolinite | Kaolinite | |
| Holding Period (Min) |  |  |  |  | — |  | 30 | |
| Electrical Conduction Period (Hours) |  |  |  | 5 |  | 0.75 | 0.5 | |
| Rate of Corrosion Progress (mm/Hour: however, mm/Day For Only Test Ex 1) | MUT | 1 Coating Condition A | 0.1 | 0.4 | 1.4 | 9.3 | 16 | 0.44 |
| | | 2 Coating Condition B | x | 0.3 | 2 | 8.3 | 20 | 0.60 |
| | | 3 Coating Condition C | x | 0.1 | 1.1 | 5.6 | 12 | 0.30 |
| | | 4 Coating Condition D | x | 0.2 | 0.04 | 6.0 | 11 | 0.27 |
| | | 5 Coating Condition E | x | 0.1 | 0.6 | 3.5 | 11.4 | 0.33 |
| | | 6 Coating Condition F | x | 0.03 | 0.6 | — | — | 0.13 |
| | | 7 Coating Condition G | x | 0.02 | 0.4 | 12 | 4 | 0.10 |
| Correlation with Test Ex. 1 | $R^1$ |  | — | 0.68 | 0.86 | 0.70 | 0.96 | — |
| | Evaluation |  | x | Δ | ○ | Δ | ○ | |
| | Comprehensive Evaluation |  | x | x | Δ | Δ | ○ | |

TABLE 2

| Coating Condition | Chemical Treatment Period (Sec.) | Electrodeposition Baking Condition |
|---|---|---|
| A | 120 | 140° C. × 15 Min. |
| B | 10 | 140° C. × 20 Min. |
| C | 30 | |
| D | 120 | |
| E | 10 | 150° C. × 20 Min. |
| F | 30 | |
| G | 120 | |

The corrosion resistance tests for the MUTs were conducted using the embodiment of the corrosion resistance tester shown in FIGS. 1 to 4. The body 31 of a container 30 is made of acrylic resin, and has dimensions specified so as to be adapted to the distance between artificial defects 5 described below, the size of electrodes 12, and other sizes.

Magnets 33 used were ring-shaped neodymium magnets having a thickness of 3 mm and a height of 7 mm. The magnets 33 were respectively contained in grooves 304, and were then each encapsulated in an epoxy resin. Then, as illustrated in FIGS. 1 and 2, a bottom portion 32 made of silicone resin covered the grooves 304 in which the magnets 33 were respectively contained.

The two artificial defects 5 having a size of 1 mm and reaching the steel sheet 2 were introduced quantitatively, i.e., at a load (test force) of 30 kg, to each of the MUTs at a distance of 4 cm using a Vickers hardness tester.

In the tests of first and second comparative examples, a sodium chloride solution obtained by mixing 50 g of sodium chloride as a supporting electrolyte into 1.3 L of water was used as the water-containing electrolyte material 6. In the tests of third and fourth comparative examples as well as a first reference example, simulated mud obtained by mixing 50 g of sodium chloride as a supporting electrolyte and 500 g of kaolinite as clay minerals into 1.3 L of water was used as the water-containing electrolyte material 6.

As the electrodes 12, ring-shaped perforated electrodes (made of platinum) with an outer diameter of about 32 mm and an inner diameter of about 30 mm were used.

A hot plate was placed under the steel sheet, and a rubber heater was wound around the through-holes to increase, and maintain, the temperatures of the steel sheet and the water-containing electrolyte material 6 as shown in Table 1.

Electrical conduction was performed by the conduction means 8 at a current value of 1 mA for the conduction period shown in Table 1. In the first through fourth comparative examples, electrical conduction was performed immediately after the treatment. In the first reference example, the MUTs were held at 70° C. for 30 minutes after the treatment and before the electrical conduction.

Figure 6:
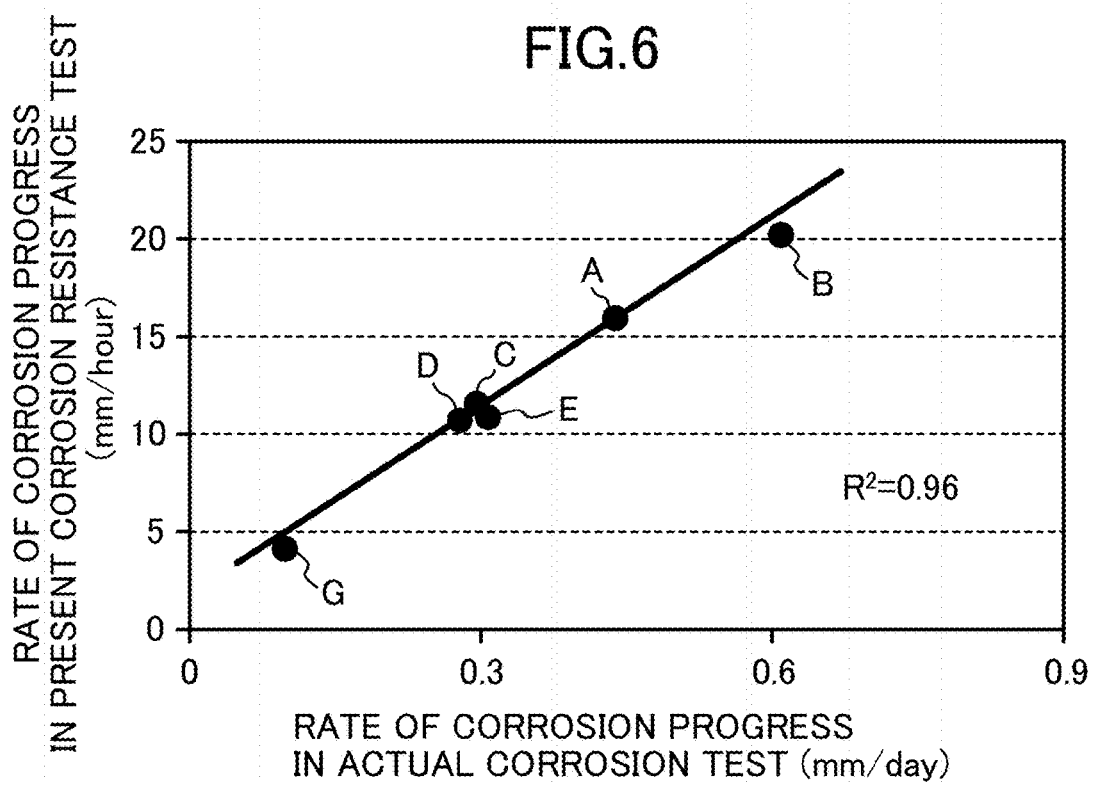
FIG. 6 is a graph showing the correlation between the rates of corrosion progress in a first reference example and a first test example.

After the end of the electrical conduction, the rates of corrosion progress (the rates of swelling of the coats) were measured for the respective MUTs by the method described above in the corrosion resistance evaluation Table 1 shows the rates of corrosion progress (the rates of swelling of the coats) obtained by the tests in the first reference example and the first through fourth comparative examples. A first test example shows the rates of corrosion progress obtained as a result of actual corrosion tests in which simulated mud is deposited on the artificial defects 5 of the MUTs, which are exposed to an environment at a temperature of 50° C. and a humidity of 98%. FIG. 6 shows the correlation between the rates of corrosion progress in the first reference example and in the first test example.

It is found from the correlation shown in Table 1 and FIG. 6 with respect to the MUTs 1 to 5 and 7 of the first reference example that the rates of corrosion progress according to the present corrosion resistance tests and according to the actual corrosion tests are highly correlated ($R^2=0.96$).

On the other hand, it is found from the correlation shown in Table 1 with respect to the second and fourth comparative examples that the rates of corrosion progress according to these comparative examples and according to the first test example are less correlated at $R^2=0.68$ and 0.70, respectively. In the third comparative example, although the correlation is relatively high ($R^2=0.86$), it is found that the electrical conduction period lasts long, i.e., lasts for five hours. With respect to the test of the first comparative example, swelling of the coat was observed in none of the MUTs 2 to 7.

—Capability of Water-Containing Electrolyte Material Promoting Water Absorption of Coats—

Various deposits were provided on the surfaces of various types of the electrodeposition coats 4 with different thicknesses under different baking conditions to examine the water absorption and swelling rates of the electrodeposition coats 4 after nine days. The following five types and states of the deposits are shown in FIGS. 7 to 9: water, 5% of NaCl (spray), 5% of CaCl2 (spray), simulated mud, and 5% of NaCl (immersion). The "simulated mud" contains water, kaolinite, sodium chloride, sodium sulfate, and calcium chloride. The ratio (mass ratio) of water to kaolinite to sodium chloride to sodium sulfate to calcium chloride is 500 to 500 to 25 to 25 to 25.

According to FIG. 7, each of the water, 5% of NaCl (spray), and 5% of $CaCl_2$ (spray) had slight water absorption and little swelling of the coat even after nine days.

By contrast, according to FIG. 8, the simulated mud had significantly improved water absorption and swelling rate after nine days as compared to the water, 5% of NaCl (spray) and 5% of $CaCl_2$ (spray). In particular, it is clear from the comparison under the same baking conditions 150° C.×20 min of the electrodeposition coat 4 that the simulated mud has remarkably improved water absorption and swelling rate.

According to FIG. 9, 5% of NaCl (immersion) had higher water absorption and swelling rate than the water, 5% of NaCl (spray) and 5% of $CaCl_2$ (spray), but much lower than the simulated mud of FIG. 8.

Figure 10:
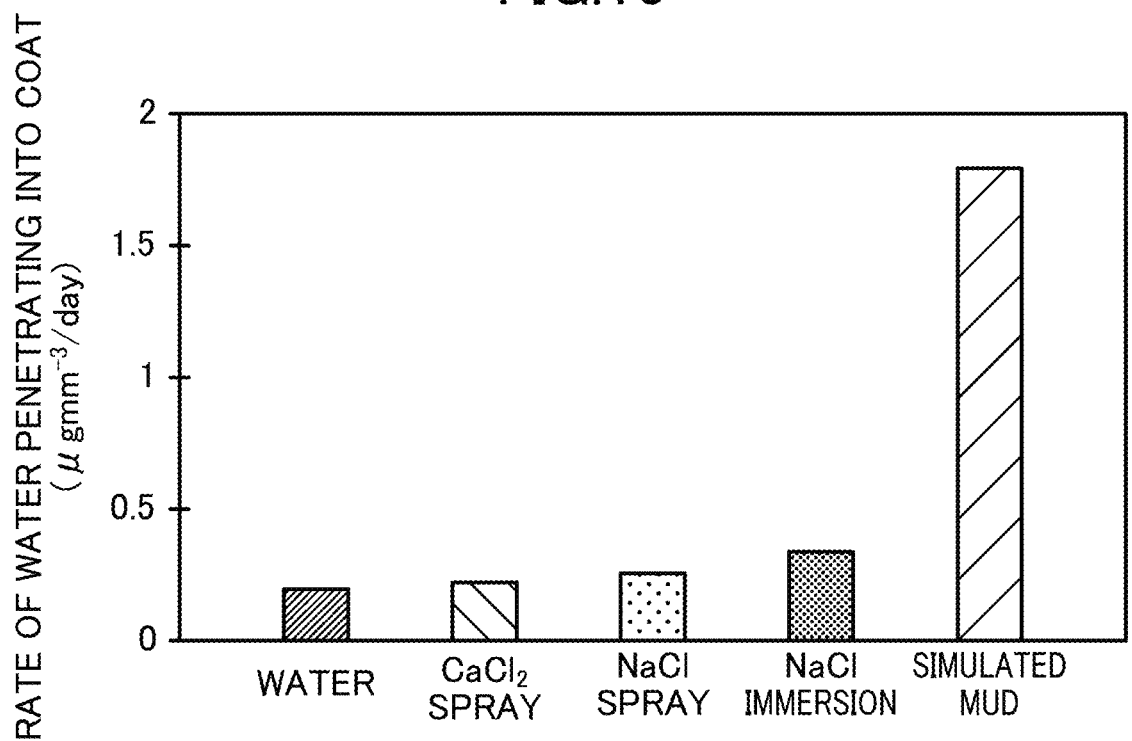
FIG. 10 is a graph showing the rates of water penetrating from the respective deposits into the coats.

FIG. 10 shows comparison in the rates of water penetrating into the coats among the five types where the electrodeposition coats 4 were baked under the conditions of 150° C.×20 min. The rates of water penetrating into the coats were calculated based on the period until the water absorption of the coats reached 25 μg/mm³. According to the figure, it is found that the simulated mud had largely increased rate of water penetrating into the coats as compared to the salt water spray, for example.

—Control of Electrical Conduction—

In the corrosion resistance tests according to this embodiment, the electricity is conducted to the steel sheet 2 not only by the constant-current control method but also by a constant-voltage control method.

Figure 11:
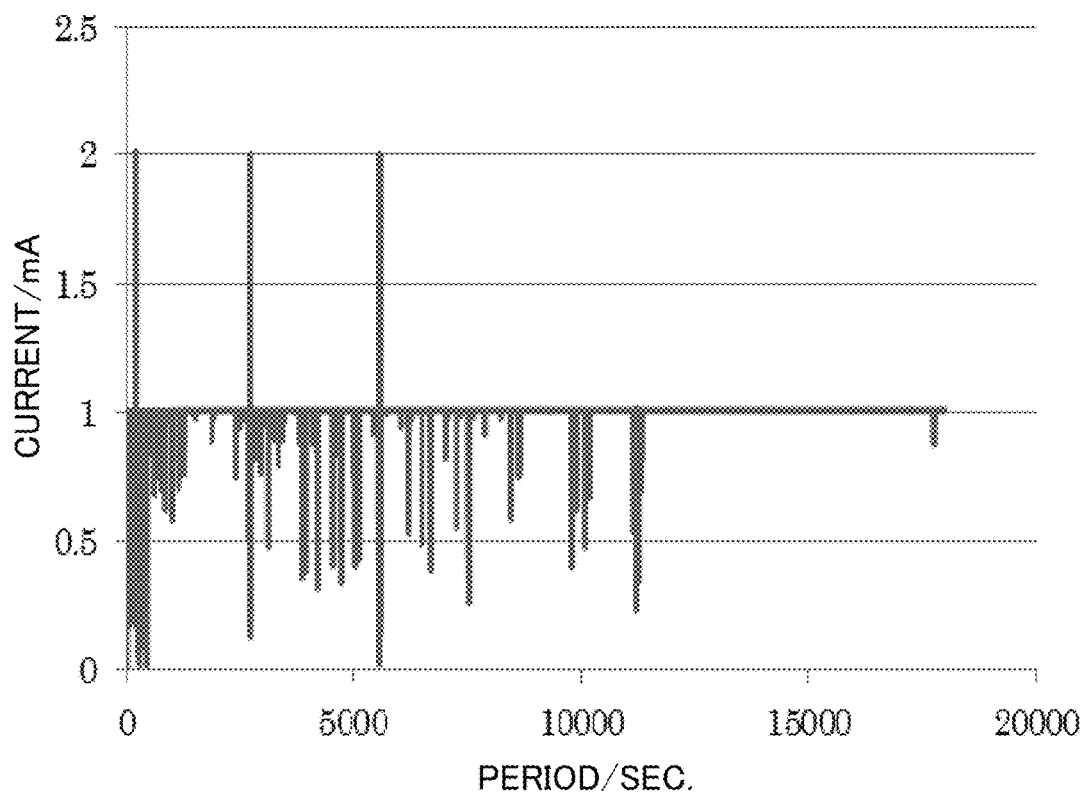
FIG. 11 is a current plot where electrical conduction is controlled at a constant current in the corrosion resistance test.
Figure 12:
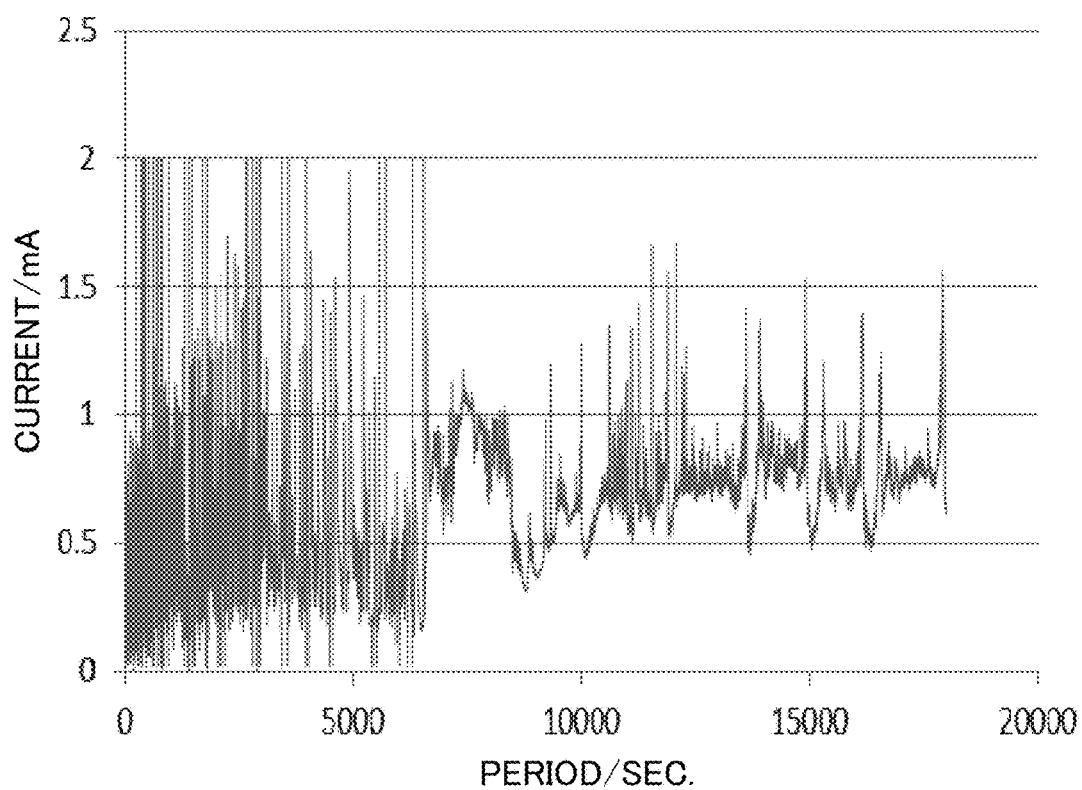
FIG. 12 is a current plot where electrical conduction is controlled at a constant voltage in the corrosion resistance test.

FIG. 11 is a current plot of electrical conduction controlled at a constant current of 1 mA (the test of the MUT 1 of the third comparative example). FIG. 12 is a current plot where a constant voltage high enough to allow a current of 1 mA to flow through the MUT is applied to the MUT. The corrosion resistance tests were conducted by the constant-current control and the constant-voltage control under the same conditions as the MUT 1 in the third comparative example except the electrical conduction conditions.

In the constant-current control, the current value varies a little at the initial stage of electrical conduction but is controlled at about 1 mA. In this manner, the current value directly involved in the acceleration of corrosion is stabilized, which improves the reproducibility and acceleration of corrosion. That is, the reliability of the corrosion resistance tests improves.

By contrast, in the constant-voltage control, it is found that the current value varies greatly, which is disadvantageous in reproducibility and acceleration of corrosion. The period in which the current greatly varies for about 7000 seconds from the start of electrical conduction corresponds to the period in which water penetrates into the electrodeposition coat 4. This great variation of the current value may result from the water not steadily proceeding to penetrate into the coat 4. After that, the current value still varies within a range from 0.5 mA to 1.5 mA. This may be caused by the influence of the variation in the resistance value due to the deteriorated conversion coating and rusting. The method of testing corrosion resistance according to this embodiment includes the holding before the electrical conduction, and thus reduces the variation in the current value for about 7000 seconds from the start of the electrical conduction. It is considered from the current plot (current waveform) in the constant-voltage control that the state and degree of corrosion in the stage in which the corrosion progresses are easily figured out.

Advantages

As described above, the use of a corrosion resistance tester according to this embodiment allows a corrosion test to be conducted for a shorter period with higher reliability than the actual corrosion test as shown in the first test example. In particular, placing a container 30 having a plurality of through-holes 11 containing the water-containing electrolyte material 6 on an electrodeposition coat 4 allows the water-containing electrolyte material 6 to be in contact with each of a plurality of measurement target portions 4A. Thus, the through-holes 11 each functioning as the water-containing electrolyte material holder enable a highly reliable corrosion test having a simpler configuration. Furthermore, the through-holes 11 formed through the single container make it easier to dispose the water-containing electrolyte material 6 such that the water-containing electrolyte material 6 is in contact with the predetermined measurement target portions 4A, and make it difficult for the water-containing electrolyte material 6 to be displaced. This can improve the reliability of the corrosion resistance test.

In one preferred embodiment, the measurement target portions 4A are each provided with an artificial defect 5, and the use of simulated mud containing clay minerals as the water-containing electrolyte material 6 allows water to rapidly penetrate into the coat, which leads to rapid and stable conduction of the corrosion resistance tests. Further, holding is performed before electrical conduction, and in the holding and the conduction, the temperatures of the water-containing electrolyte material 6 and the coated metal material 1 are increased to predetermined temperatures and maintained, thereby promoting, in advance, the migration of ions and penetration of water into the electrodeposition coat 4. This enables accurate evaluation of the rate of corrosion progress in a decreased time.

The corrosion resistance tester according to this embodiment can be suitably used, for example, if, in a manufacturing process of an automobile member, for example, parts are taken out from the manufacturing line in each coating step and the qualities of the coats are checked.

Second Embodiment

Other embodiments according to the present disclosure will now be described in detail. In the description of the embodiments, the same reference characters as those in the first embodiment are used to represent equivalent elements, and the detailed explanation thereof will be omitted.

Figure 13:
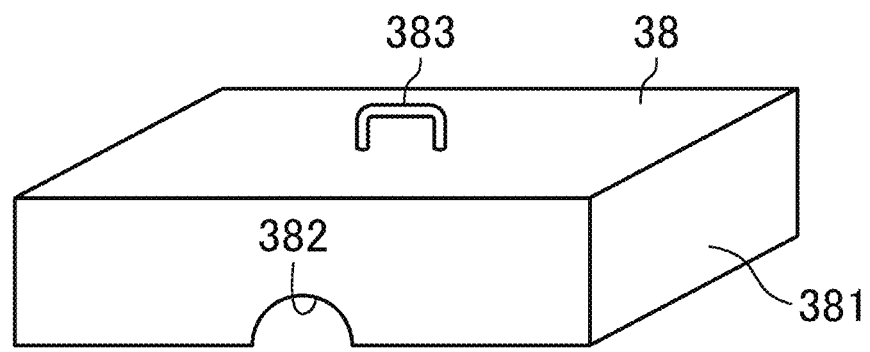
FIG. 13 is a perspective view of a cover for use in a corrosion resistance tester according to a second embodiment.

A cover 38 shown in FIG. 13 may be provided to cover the container 30 and the coated metal material 1 of FIG. 1. The cover 38 includes, for example, a cover body 381, a notch 382 provided on a side surface of the cover body 381, and a handle 383 provided on an upper portion of the cover body 381. While the handle 383 is held, and wiring and other portions of the external circuit 7 and temperature controller 36 are taken out of the notch 382, the cover 38 is arranged such that the cover body 381 covers the entire container 30 and the entire coated metal material 1. This configuration makes it easy to adjust the temperatures of the water-containing electrolyte material 6 and the coated metal material 1, and allows these temperatures to be kept constant. This can improve the reliability of corrosion resistance tests.

Other Embodiments

The number of the measurement target portions 4A may be three or more. The container 30 may have three or more through-holes 11. The measurement target portions 4A may have no artificial defect 5. If three or more measurement target portions 4A are provided, all or some of the measurement target portions 4A may have an artificial defect 5, or may have no artificial defect 5.

The outer shape of the container 30 should not be limited to that in the first embodiment. The container 30 may be a member having another shape such as a rectangular shape in plan view.

The coated metal material 1 does not have to be plate-like, and may be, for example, block-shaped, rod-like, or spherical. The measurement target portions 4A may be located on a curved surface or at a corner. In this case, the shapes of the container 30 and through-holes 11, the shape of the electrodes 12, and other shapes may be appropriately modified in accordance with the shape of the measurement target portions 4A.

The container 30 does not have to have a sheet-like sealing member as a bottom portion 32. In this case, for example, a rubber mat or a silicone resin sheet having holes through each of which the associated measurement target portion 4A is exposed may be disposed on the electrodeposition coat 4 of the coated metal material 1, and the container 30 may be placed thereon.

The magnets 33 do not have to be provided. If the magnets 33 are provided, the magnets 33 should not be limited to ring-shaped magnets. For example, a plurality of block-shaped, disk-shaped, or spherical magnets may be arranged around each of the through-holes 11. Alternatively, a magnet sheet or any other suitable member may be provided as a portion of the bottom portion 32.

The temperature of the apparatus as a whole may be increased and adjusted without providing the rubber heater 34 and the hot plate 35.

While including the electrodeposition coat 4 as the surface treatment film in the embodiments described above, the coated metal material 1 may include a multilayer film of two or more layers as the surface treatment film. Specifically, for example, the multilayer film may include, in addition to the electrodeposition coat 4, an intermediate coat on the surface of the electrodeposition coat 4 and selectively include a finish coat or any other coat on the intermediate coat.

The intermediate coat serves to provide reliable finishing and chipping resistance of the coated metal material 1 and to improve the adhesion between the electrodeposition coat 4 and the finish coat. The finish coat provides reliable color, finishing, and weather resistance of the coating metal material 1. Specifically, these coats may be made of, for example, a paint containing a base resin, such as a polyester resin, an acrylic resin, or an alkyd resin; and a crosslinking agent, such as a melamine resin, a urea resin, or a polyisocyanate compound (including a block copolymer).

While being the perforated electrode(s) with the hole(s) 12a in the embodiments described above, the electrode(s) 12 may be provided with no hole(s) 12a. The shape of the electrode(s) is not particularly limited. The electrode(s) may be in a shape generally used for electrochemical measurement.

The present disclosure is very useful, because it can provide a corrosion resistance tester which has a simple configuration and which may improve the reliability of a corrosion resistance test.

What is claimed is:

1. A corrosion resistance tester for a coated metal material including a surface treatment film on a metal substrate, the tester comprising:
   a container placed on the surface treatment film, and having a bottom surface in contact with the surface treatment film, the container including a plurality of water-containing electrolyte material holders that open through the bottom surface;
   the water-containing electrolyte material contained in each of the water-containing electrolyte material holders of the container, and being in contact with an associated one of a plurality of separate measurement target portions of the surface treatment film;
   a plurality of electrodes being each in contact with the water-containing electrolyte material contained in an associated one of the water-containing electrolyte material holders;
   an external circuit connecting the electrodes together; and
   a galvanostat configured to conduct electricity to the metal substrate through the electrodes and the external circuit, wherein
   the galvanostat conducts electricity to the metal substrate so that swelling of the surface treatment film progresses at at least one of the measurement target portions.

2. The corrosion resistance tester of claim 1, wherein the bottom surface of the container is flat, and each of the water-containing electrolyte material holders has an opening formed through the bottom surface, and is configured as a through-hole passing through the container in a direction perpendicular to the bottom surface.

3. The corrosion resistance tester of claim 2, wherein the metal substrate is a steel plate, and the container includes magnets near the bottom surface, the magnets being respectively disposed near the openings of the through-holes.

4. The corrosion resistance tester of claim 1, further comprising:
   a first heating element disposed on a periphery of the container to cover peripheries of the water-containing electrolyte material holders; and
   a temperature controller connected to the first heating element to control a temperature of the first heating element.

5. The corrosion resistance tester of claim 4, further comprising:
   a second heating element disposed on a surface of the coated metal material remote from the container, wherein
   the temperature controller controls the temperature of the first heating element and a temperature of the second heating element within a range from 30° C. to 100° C.

6. The corrosion resistance tester of claim 1, wherein the container includes:
   a bottom portion made of silicone resin, the bottom portion forming the bottom surface of the container; and
   a body made of an insulative resin material, the body extending in a direction away from the bottom surface of the bottom portion.

7. The corrosion resistance tester of claim 1, wherein
   each of the measurement target portions includes an artificial defect passing through the surface treatment film to reach the metal substrate, and
   the galvanostat conducts electricity to the metal substrate, using at least one of the artificial defects and at least another one of the artificial defects as an anode site and a cathode site, respectively, so that, at the cathode site, the swelling of the surface treatment film progresses.

8. The corrosion resistance tester of claim 7, wherein a distance between the artificial defects is longer than or equal to 2 cm.

9. The corrosion resistance tester of claim 7, wherein the artificial defect serving as the cathode site has a size ranging from 0.1 mm to 5 mm.

10. The corrosion resistance tester of claim 1, wherein the galvanostat conducts electricity to the metal substrate at a current value from 10 μA to 10 mA.

11. The corrosion resistance tester of claim 1, wherein the water-containing electrolyte material is mud containing water, a supporting electrolyte, and a clay mineral.

12. The corrosion resistance tester of claim 11, wherein the clay mineral is a layered silicate mineral or zeolite.

13. The corrosion resistance tester of claim 1, wherein the surface treatment film is a resin coat.

14. A method of testing a corrosion resistance of a coated metal material including a surface treatment film on a metal substrate, the method comprising:
   placing a container on the surface treatment film, the container having a bottom surface in contact with the surface treatment film, the container including a plurality of water-containing electrolyte material holders that open through the bottom surface;
   making each of the water-containing electrolyte material holders of the container contain the water-containing electrolyte material to bring the water-containing electrolyte material into contact with a plurality of separate measurement target portions of the surface treatment film;
   bringing a plurality of electrodes into contact with the water-containing electrolyte material contained in an associated one of the water-containing electrolyte material holders; and
   energizing the metal substrate through the electrodes and an external circuit connecting the electrodes together, wherein
   energizing the metal substrate is performed so that swelling of the surface treatment film progresses at at least one of the measurement target portions.

15. The method of claim 14, wherein
   each of the measurement target portions includes an artificial defect passing through the surface treatment film to reach the metal substrate, and
   energizing the metal substrate is performed, using at least one of the artificial defects and at least another one of the artificial defects as an anode site and a cathode site, respectively so that, at the cathode site, the swelling of the surface treatment film progresses.

16. The method of claim 15, wherein a distance between the artificial defects is longer than or equal to 2 cm.

17. The method of claim 15, wherein the artificial defect serving as the cathode site has a size ranging from 0.1 mm to 5 mm.

18. The method of claim 14, wherein the water-containing electrolyte material is mud containing water, a supporting electrolyte, and a clay mineral.

19. The method of claim 18, wherein
the clay mineral is a layered silicate mineral or zeolite.
20. The method of claim 14, wherein
the surface treatment film is a resin coat.

\* \* \* \* \*